Feb. 13, 1968         J. J. ALLPORT         3,368,353
                  AUTOMATIC O/F CONTROL
Filed Sept. 30, 1965                        2 Sheets-Sheet 1

INVENTOR.
JOHN J. ALLPORT
BY
ATTORNEY

United States Patent Office 3,368,353
Patented Feb. 13, 1968

3,368,353
AUTOMATIC O/F CONTROL
John J. Allport, Saratoga, Calif., assignor to United Aircraft Corporation, East Hartford, Conn., a corporation of Delaware
Filed Sept. 30, 1965, Ser. No. 491,598
6 Claims. (Cl. 60—240)

ABSTRACT OF THE DISCLOSURE

A system for controlling the oxidizer-fuel ratio of a bipropellant rocket motor by generating a signal representative of the conductivity of the exhaust gases at a point downstream of the combustion chamber. The degree of ionization of the exhaust gases is a function of the oxidizer-fuel ratio within the combustion chamber and the signal generated is used to control the feed rate of one of the propellants. The conductivity is measured by generating an RF magnetic field linking the exhaust gases and measuring the Q factor of the RF generating means which decreases as the conductivity increases. The RF generating means are located at a point outside of the gas flow.

---

This invention relates to the control of the oxidizer to fuel ratio of a rocket motor of the type utilizing at least one propellant in fluid form, and more particularly, to an automatic control system for hybrid and liquid bi-propellant rocket motors.

In order to achieve the maximum available performance from a hybrid or a liquid rocket engine, the oxidizer to fuel ratio must be maintained at a predetermined correct value for the engine thrust level throughout the period of operation. This is because at a specific combustion chamber pressure and temperature, a specific oxidizer to fuel ratio produces maximum performance.

Various attempts have been made to obtain an optimum oxidizer to fuel ratio in both liquid and hybrid rocket systems. In the liquid rocket propellant utilization systems presently relied upon, the measurement of the propellant remaining in the tankage, as well as the use of precisely calibrated flowmeters, are employed in an attempt to maintain the optimum oxidizer to fuel ratio required. In hybrid rockets, the control of the oxidizer to fuel ratio is much more complex since the regression rate of the grain is linked in a complex manner to both the oxidizer flow rate and the fuel grain port diameter. Hybrid systems, therefore, have resorted to semi-empirically programmed upstream and downstream oxidizer injection to achieve correct oxidizer to fuel ratios over the operation time of an engine and throughout variations in engine thrust. However, because of the problems noted above, it is an extremely difficult design problem to accurately design a grain and preprogram the oxidizer flow so that the engine always operates at an optimum oxidizer to fuel ratio.

Other attempts to detect the $O/F$ ratio within the combustion chamber have not been too successful since at operating conditions easily measured, parameters such as temperature or pressure are not responsive to small variations in $O/F$ ratios. These small variations, however, can produce substantial effects on optimum performance.

This invention, while having particular advantages in hybrid rocket motors, is also applicable to liquid bi-propellant systems, and involves the sensing of the oxidizer to fuel ratio within the combustion chamber by measuring a parameter of the combustion gases at a point along the divergent portion of the supersonic nozzle, and then utilizing a signal produced from this sensing to control the flow of additional fluid material to the system to bring the oxidizer to fuel ratio to the desired level. Such a system is not only simple and more economical than the systems presently in use, but can also reduce the weight of the control apparatus required to maintain optimum performance, thereby increasing the effective payload of the rocket system. Also, since the proposed system reduces the number of electrical and mechanical components required, the possibility of failure is reduced and the reliability of the rocket system increased.

It is, accordingly, one object of this invention to provide a method for automatically controlling the oxidizer to fuel ratio of a rocket motor so that it operates continuously at the optimum.

It is another object of this invention to provide a method and apparatus for detecting the oxidizer to fuel ratio within the combustion chamber of a rocket motor by means located outside of the combustion chamber.

It is another object of this invention to provide means for detecting the electrical conductivity of a gas stream.

These and other objects of the invention will be readily apparent from the following description with reference to the accompanying drawings wherein.

Figure 1:
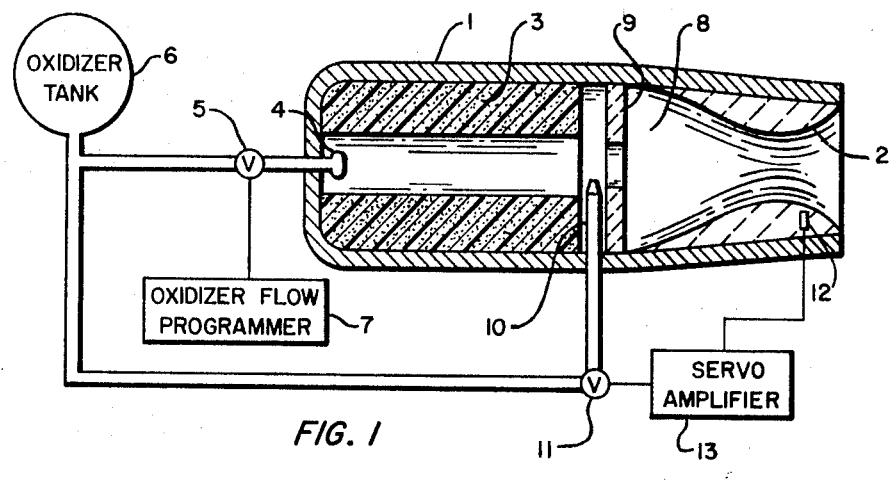
FIGURE 1 is a cross-sectional view of a hybrid rocket motor together with a schematic representation of the instrumentation according to this invention.

Referring now to FIGURE 1, a hybrid motor of the type known to the art is shown. Such motors generally use a liquid oxidizer and a solid fuel, and, for clarity, such a system will be described in detail below; however, it is recognized that it is possible to use liquid fuels and solid oxidizer materials, and it should be understood that the instant invention is also applicable to such a system. The fuel and oxidizer materials can be selected from any of those materials now commonly known in the art, and, except as more fully explained below, the specific compositions of the fuel and oxidizer are not critical. A typical hybrid rocket, according to this invention, consists of a casing 1 open at its aft end, and containing nozzle defining means 2 which typically are constructed of graphite or refractory ablative materials such as alumina or boron nitride. The propellant grain 3 in the form of a hollow cylinder, for example, is mounted in the forward end of the casing. Such a grain is typically a tough polymeric material, incapable of self-sustaining combustion, comprising the hybrid fuel and which may or may not contain burning rate catalysts, regression rate controlling agents, and particles of high energetic fuel material as is well-known in the art. An injector 4 is mounted in the forward end of the casing 1 adapted to spray the oxidizer into contact with the fuel grain. The injector is connected through main oxidizer control valve 5 to the oxidizer tank 6, which is suitably pressurized to maintain flow of the oxidizer to the injector. Oxidizer flow control valve is automatically controlled by oxidizer flow programmer 6, as is conventional in the art. The grain 3 is not coextensive with casing 1, and a mixer section 8, which may or may not be provided with mixer 9 in the form of an annular hollow ring of ablative material is mounted in mixer space 8 upstream of the nozzle and downstream of the end of propellant grain 3. Means 10 for supplying oxidizer to the mixer section 8 extends through casing wall 1 and is connected through variable flow servo valve 11 to the oxidizer supply tank 6. Transducer 12, which detects a parameter of the combustion gases that is representative of the oxidizer to fuel ratio in the combustion chamber is mounted in nozzle structure 2. Transducer 12 is connected to servo amplifier 13, which controls the operation of servo valve 11. The exact location of transducer 12 is not critical as long as it is downstream of the point where complete combustion of the combustion gases has occurred, a good location being in the divergent portion of the nozzle. The operation of a specific transducer which performs the function of detecting the O/F ratio in the combustion chamber will be described in greater detail below. In operation the oxidizer flow programmer is set so that the flow of oxidizer through injector 4 produces at all times during the operation of the motor a fuel-rich gas mixture within grain 3. The fuel-rich gas mixture escapes from the grain port into mixer section 8, and from there through supersonic nozzle 2. The transducer detects the O/F ratio within the combustion chamber by means of the gases escaping through the nozzle, sends a signal to the servo amplifier, which, in turn, controls the operation of servo-valve 11 to permit oxidizer to flow into the mixer section 8. The gases escaping through nozzle 9 now indicate a different O/F ratio in the combustion chamber than originally sensed. The transducer continually senses the O/F ratio by means of the escaping gases and through servo amplifier 13 continuously controls valve 11 to maintain the desired O/F ratio as measured by the gases escaping through the nozzle. The optimum O/F ratio is, of course, preselected from the knowledge of the design combustion chamber pressure and temperature of the hybrid motor to maximize thrust and specific impulse. The oxidizer flow programmer 7 should be designed so that the oxidizer flow continuously produces a fuel-rich gas within grain 3 throughout the burning period of the motor, and to broadly compensate for the changes in the regression rate due to port area changing. The control system, basically, is a closed loop which directly measures a propellant gas compositional parameter which when referenced to a predetermined value in a bridge circuit generates an error signal to control the flow rate of the oxidizer to the mixer section, permitting very sensitive control of engine performance.

Figure 2:
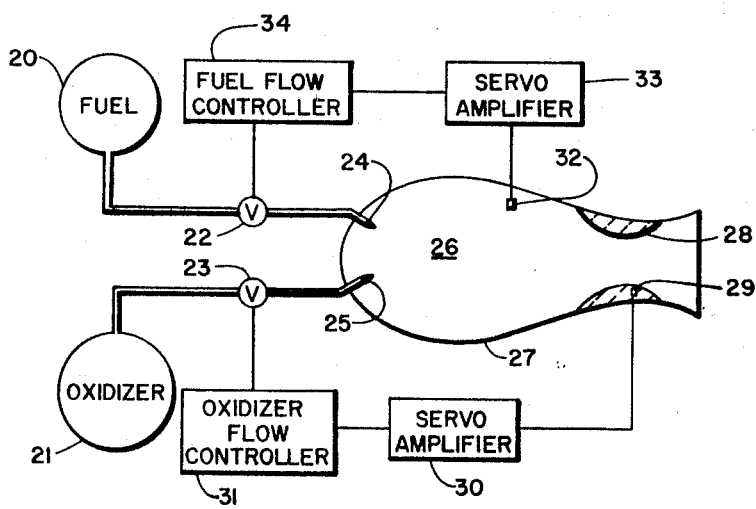
FIGURE 2 is a schematic representation of the apparatus of this invention applied to a liquid bi-propellant rocket motor.
Figure 3:
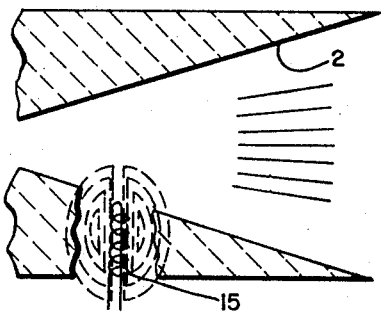
FIGURE 3 is an enlarged view of an $O/F$ ratio transducer according to this invention.

The above discussion has been directed to a hybrid motor system, however, it is also applicable to a liquid bi-propellant system, and such a system is shown schematically in FIGURE 2. Basically, such a system comprises fuel tank 20 and oxidizer tank 21 connected through variable flow valves 22, 23 to injectors 24, 25 within the combustion chamber of rocket motor 26 defined by casing 27. The aft end of casing 27 is provided with a suitable nozzle 28 which contains transducer 29 such as shown in FIGURE 3 for detecting the electrical conductivity of the escaping gases. Transducer 29 develops a signal which is fed into servo amplifier 30 which, in turn, is fed into oxidizer flow controller 31 which actuates oxidizer flow control valve 23. The pressure inside rocket motor 26 is sensed by pressure transducer 32 which generates a signal which is fed to servo amplifier 33 which produces an amplified signal which is fed into fluel flow controller 34 which actuates fuel control valve 22. According to this system, the fuel flow is used to control the operating pressure in the combustion chamber, whereas the oxidizer flow is used to control and produce the optimum oxidizer to fuel ratio for the specific chamber pressure.

Basically, the valves 22 and 23 are open to permit flow of oxidizer and fuel into chamber of rocket motor 26 and ignition occurs either hypergolically or by means of an igniter which is not shown. As the pressure in the chamber increases to design pressure, the pressure transducer 32 senses the chamber pressure which is fed through servo amplifier 33 to controller 34 which actuates valve 22 to maintain the constant fuel flow necessary to maintain a desired chamber pressure. At the same time, gases escaping through nozzle 23 produce a signal which is fed into servo 30 from transducer 29 which, in turn, is fed into oxidizer flow controller 31 to control the flow of oxidizer to the rocket engine through valve 23 to maintain the desired oxidizer to fuel ratio. As will be explained below, a minor amount of highly ionizable material, for example potassium or cesium compounds, such as potassium amide or potassium borohydride or other suitable alkali metal compounds may be added to the fuel in both liquid and hybrid systems in an amount sufficient to produce about 30 parts per million of free potassium, for example, in the exhaust gases. This would amount to approximately 0.01% in the fuel. In a constant thrust system, the fuel consumption rate is considered constant. If fuel consumption rate in either system is varied, to vary thrust, for example, the servo amplifier receiving signals from the O/F transducer would have to be programmed to compensate for the change in conductivity that would result from the changed amounts of ionized material in the gas stream.

The means for detecting the oxidizer to fuel ratio will now be discussed in greater detail. It has been found that the oxidizer to fuel ratio in the combustion chamber is related to the electrical conductivity of the combustion gases, and this electrical conductivity can be measured by the interaction of the gases with a radio frequency magnetic field. The low frequency electrical conductivity of a gas is a function of the free electron density per cubic meter and the electron collision frequency with the gas molecules and atoms and is given by the relationship $$\sigma = \frac{ne^2}{m\gamma}$$

At the static temperatures encountered in rocket engine nozzles, the ionization of some propellant gas atoms and molecules is negligible due to their high ionization potentials. To achieve an easily measured conductivity in such propellant, an alkali metal, such as potassium or cesium, which has a relatively low ionization potential, may be added in trace amounts to those propellants in which it is not already present as an impurity.

The electron density in a gas containing a partial pressure in atmospheres $p_a$ of potassium is $$n = X(p_a/p_0)(T_0/T)L$$

where X is the fractional ionization of alkali metal, $p_0$ and $T_0$ refer to standard conditions, T is the temperature of the gas, and L is the number of atoms or molecules per unit volume in a pure gas at standard conditions ($L=2.69\times10^{25}/m^3$). The fractional ionization may be obtained from the Saha equation, which for small values of X and for potassium is $X^2=3.2\times10^{-7}T^{2.5}\times10^{-5039E/T}$ where E is the ionization potential of potassium equal to 4.339 electron volts. For a given propellant containing a weight fraction, $a$, of free potassium in the flow, the electron density is: $n=aXL(p/p_0)(M/M_1)(T_0/T)$ where $p$ is the static pressure, M is the average molecular weight of the propellant gas, and $M_1$ is the atomic weight of potassium. The electron collision frequency, $\gamma$, is primarily proportional to the static pressure over the temperature range of interest: $\gamma=\gamma_0(p/p_0)$ where $\gamma_0$ is the collision frequency at 1 atm. in the temperature range of interest, and is, for example, equal to about $2\times10^{11}$ for flames at atmospheric pressure. By combining equations and inserting constants, the relation for the conductivity is found to be:

(1) $\quad \sigma=[5.81\times10^5 T^{1/4}(aM/pM_1)^{1/2}10^{-2519E/T}]$ where electron attachment processes are neglected.

The fractional variation in gas conductivity for a fractional variation in static temperature at constant static pressure is obtained by differentiation to give:

(2) $\quad d\sigma/\sigma = [0.25+5800E/T]dT/T$

Constant static pressure is assumed in this treatment to correspond to a specified thrust level, because static pressure is very insensitive to mixture ratio at a specified thrust. This equation indicates that the percentage variation in gas conductivity is considerably greater than the percentage variation in static temperature.

Figure 4:
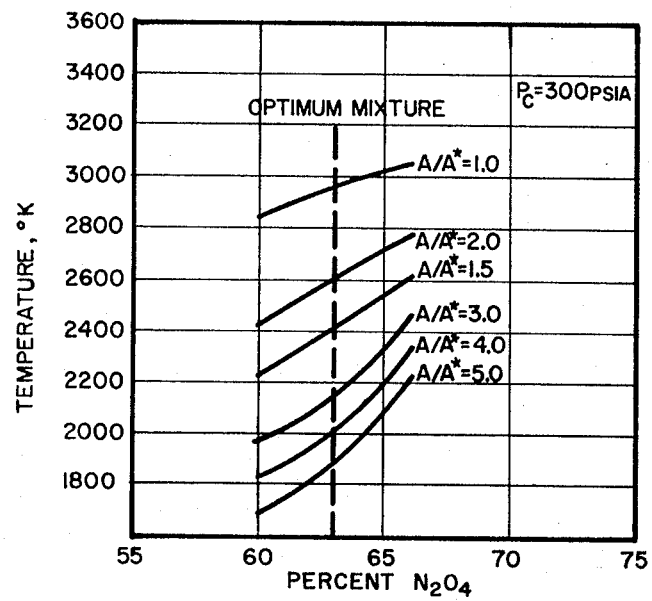
FIGURE 4 is a graph of the effect of $O/F$ ratio on static temperature for a typical system such as 50–50 hydrazine-UDMH and $N_2O_4$.

To reduce this equation to practical terms, a particular propellant system, which for simplicity of components and ease of illustration will be the liquid system of nitrogen tetroxide, 50/50 hydrazine, UDMH, will be considered. FIGURE 4 shows the static temperature as a function of the oxidizer (nitrogen tetroxide) percentage content of the propellant at various supersonic area ratios. The information presented in FIGURE 4 is derived from equilibrium machine calculations, the dotted line indicates a desired or optimum percentage of oxidizer (63 percent, oxidizer-to-fuel ratio=1.7) for the particular engine design. Inspection of the curves presented in FIGURE 4 shows that a variation of ±1 percent in the oxidizer content (±0.63 percent in absolute percentage oxidizer concentration in the propellant) leads to a static temperature variation of about ±40° K. in static temperature at supersonic area ratios between $\epsilon=1$ and $\epsilon=2$, and that a variation of ±0.25 percent in oxidizer content therefore leads to a variation of ±10° K. In order then to control the propellant composition so that the oxidizer is constant to within ±0.25 percent, the conductivity sensor must be able to detect static temperature variations of ±10° K. at low supersonic area ratios.

Figure 5:
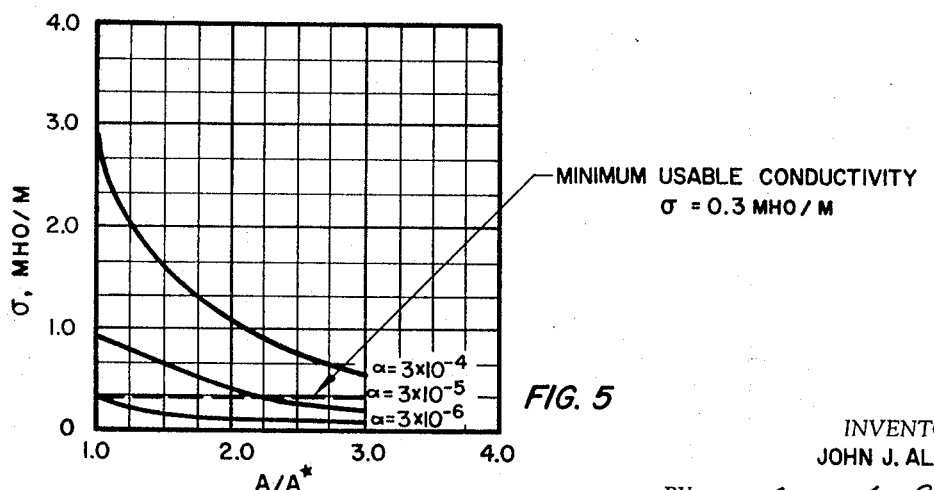
FIGURE 5 is a graph representing the effects of nozzle area ratio on electric conductivity for a typical liquid sustem such as 50–50 hydrazine-UDMH and $N_2O_4$.

In plasma conductivity measurements, plasma conductivities of 0.04 mho/m. have been accurately measured, and a variation in conductivity of 0.01 mho/m. is readily detectable. Therefore, placing $d\sigma$ in the Equation 2 equal to 0.01 mho/m. and $dT$ equal to 10° K., and solving the equation of $\sigma$ at the static temperatures for area ratios between $\epsilon=1$ and $\epsilon=2$ it is found that propellant gas conductivity of 0.3 mho/m. is necessary to detect a ±10° K. shift in static temperature. Since the propellant gas for this system is composed of species which have high ionization potentials, it is necessary to add compounds in trace amount to the fuel, and compounds such as potassium amide or potassium borohydride would be suitable additives. FIGURE 5 illustrates the conductivity realized as a function of supersonic area ratio for various amounts of free potassium in the flow. It is apparent from FIGURE 5 that a concentration of 30 p.p.m. of free potassium in the flow ($a=3\times10^{-5}$), corresponding to the addition of about 0.01 percent of potassium amide to the propellant, is sufficient to provide a conductivity in excess of the minimum required value of 0.3 mho/m. The addition of somewhat larger amounts of potassium could be utilized in an operating system to increase the reliability of the closed-loop control system.

In the above described system of $N_2O_4$—hydrazine UDMH, the electrical conductivity of the gas stream increased with increasing $O/F$ ratio. However, when the hybrid system containing Lithium-Lithium Hydride as fuel and $OF_2$ as oxidizer is utilized, the electrical conductivity is observed to decrease with increasing $O/F$ ratio. This effect is apparently due to the electron scavenging property of the fluorine which tends to reduce free ions in the gas stream. It is important, therefore, to understand that it is immaterial whether the conductivity varies directly or inversly with the $O/F$ ratio. The important feature is that the electrical conductivity of the gas stream at points in the supersonic nozzle is highly responsive to changes of the $O/F$ ratios in the combustion chamber and these relationships are readily determined for any particular system.

As shown in FIGURE 3, the ionized gases escaping through nozzle 2 pass through a radio frequency magnetic field having a frequency in the range from 1 to 30 mc. which is produced by radio frequency coil 15 embedded within nozzle structure 2. The frequency is not critical but should be selected so that under the operating condition the magnetic field extends sufficiently far into the ionized gas stream so that there is substantial interaction between the ionized gas stream and the magnetic field. The radio frequency magnetic field from coil 15 links the propellant gas flow.

In the drawing, the nozzle is constructed from a nonconducting material such as alumina or boron nitride. However, if a conductor such as graphite is used, a nonconducting cap must be placed over the transducer so that the RF field enters the gas stream through a nonconductor. This is necessary because at the frequencies used herein the RF field would not penetrate into the gas stream through a conductive material such as graphite. The oscillating magnetic field induces an oscillating electric field in the flow in accordance with Maxwell's Relations. Since the gas is a conductor, the oscillating electric field causes current loops to form in the gas and part of the energy in the radio frequency magnetic field of the coil is dissipated in heating of the gas. The amount of energy dissipated in heating of the gas is directly proportional to the gas conductivity and results in a decrease in the Q or quality factor of the coil which may be detected electronically by means known to those skilled in the art to measure the gas conductivity. This signal is compared in a bridge circuit in the servo amplifier 13 to a preset signal representing the desired conductivity. The error signal from the bridge comparison is amplified and the amplified signal is used to drive the actuating means of oxidizer control valve 11 so as to produce a null in the bridge circuit. The preset signal, of course, must be determined in a careful manner from ground test information for the desired rocket motor design configuration. Experimental results indicate that conductivities as low as 0.01 mho/meter may be accurately measured by this technique.

Since the radio frequency coil is sensitive to changes of geometry of the coil, and also to changes in the coil resistance, it is necessary to provide sufficient cooling to the device to maintain it at a fairly constant temperature. Cooling coils, therefore, may be embedded in the nozzle, surrounding coil 15 to maintain a fairly constant temperature in the area of the coils. For the sake of clarity, however, such cooling means are not shown in the accompanying drawings. If cooling means are not provided, a thermocouple or thermistor head, for example, could be used to monitor the temperature of the coil and through a properly designed electrical circuit provide a correction signal to the comparison bridge of the servo amplifier to correct for thermal effects.

While this invention has been disclosed with respect to several different embodiments thereof, it is readily apparent that the invention is not limited thereto.

While the transducer 12 has been shown embedded in the nozzle structure itself, it may in certain systems be desirable to locate it elsewhere. In low expansion ratio nozzles, for example, the transducer could be supported on the nozzle extension at the exit plane and the conductivity detected at that point. Other transducers for detecting either the same or different parameters of the exhaust gas stream which are indicative of the $O/F$ ratio in the combustion chamber could also be employed.

Other modifications and alterations within the skill of the art are contemplated within the scope of this invention which is limited only by the scope of the following claims.

I claim:

1. A system for controlling the oxidizer-fuel ratio of a bipropellant rocket motor comprising:
   (a) a combustion chamber;
   (b) convergent-divergent nozzle means at the aft end of said combustion chamber;
   (c) means for supplying a first propellant component to said combustion chamber;
   (d) means for providing a second propellant component within said combustion chamber, said first propellant component being in fluid form and said first and second propellant components being reactable to produce combustion products which are at least partially ionized;

(e) signal generating means, mounted within the structure of the divergent portion of said nozzle means, for generating a signal representative of the oxidizer to fuel ratio within said combustion chamber, said signal generating means comprising means for generating a radio-frequency magnetic field which field extends into the flow path of said combustion products within the divergent portion of said nozzle means;

(f) means for comparing signals generated by said signal generating means with a predetermined signal representative of optimum oxidizer-fuel ratio; and (g) flow control means responsive to differences between said generated signal and said predetermined signal for varying the flow of said first propellant component to said combustion chamber whereby the oxidizer-fuel ratio within said combustion chamber is made to approach said optimum value.

2. The system of claim 1 wherein said means for generating a radio-frequency magnetic field comprises a coil and the signal generated is representative of the energy dissipation of said magnetic field.

3. The system of claim 2 wherein said bipropellant rocket motor is a hybrid rocket motor and said second propellant component is in the form of a solid propellant component grain within the combustion chamber.

4. The system of claim 3 wherein said means for supplying said first component propellant to said combustion chamber comprises first and second fluid supply lines, said first fluid supply line feeding said first fluid propellant to said combustion chamber at the forward end of said propellant component grain and said second fluid supply line feeding propellant to said combustion chamber at the aft end of said propellant component grain and said flow control means control the flow of said first propellant component in said second fluid supply line.

5. The system of claim 2 wherein said bipropellant rocket motor is a fluid bipropellant rocket motor and said means for providing said second fluid propellant component comprises means for injecting said second propellant component into said combustion chamber.

6. The system of claim 5 further comprising means for generating a signal representative of combustion chamber pressure and flow control means responsive to said signal for controlling the flow rate of said second propellant component to said combustion chamber.

References Cited
UNITED STATES PATENTS

| | | | |
|---|---|---|---|
| 2,777,289 | 1/1957 | Boucher | 60—29.28 |
| 2,779,917 | 1/1957 | Boisblanc | 324—30 |
| 2,782,103 | 2/1957 | Prentiss | 73—26 |
| 2,799,136 | 7/1957 | Boisblanc | 60—243 |
| 2,975,375 | 3/1961 | Goldstein | 60—264 |
| 3,128,599 | 4/1964 | Carr | 60—251 |
| 3,152,303 | 10/1964 | Lary | 324—30 |
| 3,249,869 | 5/1966 | Meyer | 324—40 |

CARLTON R. CROYLE, *Primary Examiner.*

MARK M. NEWMAN, *Examiner.*

D. HART, *Assistant Examiner.*